(12) United States Patent
Robert Safavi et al.

(10) Patent No.: US 10,476,633 B2
(45) Date of Patent: Nov. 12, 2019

(54) APPARATUS AND METHOD FOR SIGNALLING OF NON-ORTHOGONAL TRANSMISSIONS

(71) Applicant: HUAWEI TECHNOLOGIES CO., LTD., Shenzhen, Guangdong (CN)

(72) Inventors: Anahid Robert Safavi, Kista (SE); Pablo Soldati, Kista (SE); Fredrik Berggren, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/674,902

(22) Filed: Aug. 11, 2017

(65) Prior Publication Data
US 2017/0346598 A1 Nov. 30, 2017

Related U.S. Application Data

(63) Continuation of application No. PCT/EP2015/052940, filed on Feb. 12, 2015.

(51) Int. Cl.
*H04W 4/00* (2018.01)
*H04L 1/00* (2006.01)
(Continued)

(52) U.S. Cl.
CPC ........ *H04L 1/0048* (2013.01); *H04J 11/0043* (2013.01); *H04W 52/283* (2013.01); *H04L 5/001* (2013.01); *H04L 5/0023* (2013.01)

(58) Field of Classification Search
None
See application file for complete search history.

(56) References Cited

U.S. PATENT DOCUMENTS 9,749,819 B2 * 8/2017 Sun .................... H04W 4/08
9,906,397 B2 * 2/2018 Park .................... H04L 1/00
(Continued)

FOREIGN PATENT DOCUMENTS

| CN | 1671132 A | 9/2005 |
|---|---|---|
| EP | 2 461 514 A2 | 6/2012 |
| WO | WO 2007/109917 A1 | 10/2007 |

OTHER PUBLICATIONS

U.S. Appl. No. 61/985,383, filed Apr. 28, 2014 (Year: 2014).*
(Continued)

*Primary Examiner* — Sithu Ko
(74) *Attorney, Agent, or Firm* — Slater Matsil, LLP (57) ABSTRACT

An apparatus for receiving non-orthogonal transmissions in a wireless communication system includes a processor configured to determine a first superposed symbol from a plurality of superposed symbols, based on superposition information and a first set of decoding information, wherein the first superposed symbol is corresponding to a first user equipment. The processor generates a residual signal based on the first superposed symbol and the superposition information, and determines a second superposed symbol based on the residual signal and a second set of decoding information, wherein the second superposed symbol is corresponding to a second user equipment. The superposition information comprises a quantity of the plurality of superposed symbols and an ordering of the plurality of superposed symbols.

10 Claims, 6 Drawing Sheets

(51) Int. Cl.
    *H04J 11/00*     (2006.01)
    *H04W 52/28*     (2009.01)
    *H04L 5/00*     (2006.01)

(56) References Cited

U.S. PATENT DOCUMENTS

| | | | |
|---|---|---|---|
| 2005/0207351 A1 | 9/2005 | Inagawa | |
| 2009/0296662 A1* | 12/2009 | Laroia | H04L 1/1607 370/335 |
| 2014/0086372 A1 | 3/2014 | Kishiyama et al. | |
| 2015/0312074 A1* | 10/2015 | Zhu | H04L 27/2627 370/329 |
| 2015/0351081 A1* | 12/2015 | Zhu | H04J 11/003 370/329 |
| 2016/0014785 A1* | 1/2016 | Benjebbour | H04W 52/241 370/329 |
| 2016/0073382 A1* | 3/2016 | Li | H04W 72/1289 370/329 |
| 2016/0128025 A1* | 5/2016 | Zhang | H04J 11/005 370/329 |
| 2016/0142193 A1* | 5/2016 | Benjebbour | H04J 11/0043 370/329 |
| 2016/0204969 A1* | 7/2016 | Zhu | H04L 27/3405 375/261 |
| 2016/0219529 A1* | 7/2016 | Benjebbour | H04W 52/14 |

OTHER PUBLICATIONS

U.S. Appl. No. 62/046,464, filed Sep. 5, 2014 (Year: 2014).*
Anass Benjebbour, et al., "Concept and Practical Considerations of Non-orthogonal Multiple Access (NOMA) for Future Radio Access," 2013 International Symposium on Intelligent Signal Processing and Communication Systems, IEEE, Nov. 12, 2013, pp. 770-774.
Yuki Endo et al., "A Study on Transmission Power Control Considering Inter-Cell Interference for Non-orthogonal Access with MMSE-SIC in Cellular Uplink," Abstract only, IEICE Tech. Rep., vol. 112, No. 89, RCS2012-46, Jun. 14, 2012, pp. 1-3.
Intel Corporation, "Discussion on network assistance information for enhanced IS/IC receivers," 3GPP TSG-RAN WG4 Meeting #68, R4-134356, Barcelona, Spain, Aug. 19-23, 2013, pp. 1-6.
X. Cheng, "SOMA—Semi-orthogonal multiple access," Huawei internal slides, 2009, pp. 1-23.
Yuki Endo, et al., "Uplink Non-orthogonal Access with MMSE-SIC in the Presence of Inter-cell Interference," Wireless Communication Systems (ISWCS), 2012 International Symposium, Aug. 28-31, 2012, pp. 261-265.
S. Vanka, et al., "Superposition Coding Strategies: Design and Experimental Evaluation," IEEE transaction on wireless communication, vol. 11, No. 7, Jul. 2012, pp. 2628-2639.
Yuya Saito, et al., "System-Level Performance Evaluation of Downlink Non-orthogonal Multiple Access (NOMA)," 2013 IEEE 24th International Symposium on Persona, Indoor and Mobile Radio Communications: Fundamentals and PHY Track, 2013, pp. 611-615.
David Tse, et al., "Fundamentals of Wireless Communication," Cambridge University Press, Sep. 10, 2014, pp. 1-647.
Thomas M. Cover, et al., "Elements of Information Theory," Second Edition, John Wiley & Sons, Inc., 2006, pp. 1-774.
International Search Report dated Nov. 10, 2015 in corresponding International Patent Application No. PCT/EP2015/052940.
Written Opinion of the International Searching Authority dated Nov. 10, 2015 in corresponding International Patent Application No. PCT/EP2015/052940.
International Search Report dated Oct. 11, 2015 in corresponding International Application No. PCT/EP2015/052940.

* cited by examiner

APPARATUS AND METHOD FOR SIGNALLING OF NON-ORTHOGONAL TRANSMISSIONS

CROSS-REFERENCE TO RELATED APPLICATIONS

This application is a continuation of International Patent Application No. PCT/EP2015/052940, filed on Feb. 12, 2015, the disclosure of which is hereby incorporated by reference in its entirety.

TECHNICAL FIELD

The aspects of the present disclosure relate generally to wireless communication systems and in particular to control signaling for non-orthogonal transmissions between base stations and wireless user equipment.

BACKGROUND

The proliferation of modern wireless communications devices, such as cell phones, smart phones, and tablet devices, has seen an attendant rise in demand for high volume multimedia data capabilities for large populations of user equipment (UE) or mobile stations. To support this ever growing demand, future radio access (FRA) schemes will need to provide significant gains in capacity and quality of user experience (QoE) over conventional wireless access systems. Conventional wireless access technologies include a variety of transmission techniques such as time division multiple access (TDMA), code division multiple access (CDMA), frequency division multiple access (FDMA), orthogonal frequency division multiple access (OFDMA), and single carrier FDMA (SC_FDMA) as well as others, and are defined in various specifications including Long Term Evolution (LTE) and LTE-Advanced (LTE-A) being developed by the third generation partnership project (3GPP), the 802.11 and 802.16 family of wireless broadband standards maintained by the Institute of Electric and Electronic Engineers (IEEE), and WiMAX, an implementation of the IEEE 802.11 standard from the WiMAX Forum. In general these conventional systems provide transmission to many users by creating orthogonal concurrent channels separated by multiplexing with time, frequency, coding, and/or space. Servicing multiple users with separate orthogonal channels permits elimination of inter-user interference between orthogonal channels and results in relatively simple receiver designs. To obtain increased spectral efficiency, FRA systems are being proposed that will take full advantage of these conventional orthogonal technologies such as OFDMA and will obtain performance improvements by incorporating new technologies, such as non-orthogonal multiple access (NOMA), into conventional systems.

NOMA techniques superimpose symbols being transmitted to different users within the same time-frequency-spatial radio resources and exploit differences in channel gains and transmission power to separate user signals at the various UE. With NOMA, users having different signal to noise ratios are grouped together, typically with a "near user" having a stronger link to the base station, and one or more "far users" having weaker links. As used herein the term base station refers to an access node or other entity in the wireless network used to transmit signals to a plurality of UE or mobile devices. For example a common type of base station used in conventional systems is the enhanced Node-B (eNode-B) used in LTE systems. Users that have been grouped together to receive a non-orthogonal data signal are referred to herein as a superposition group. Data symbols for each user in the superposition group are then superimposed or superposed on a single radio resource, or resource element, and transmitted with different powers. A resource element (RE) is the smallest usable portion of the radio spectrum and has units of time and frequency. In multi-input multi-output (MIMO) transmission a RE may also occupy one spatial layer. Symbols belonging to near users and far users are superposed within the same RE using different transmit power weights. To differentiate between symbols that have been transmitted orthogonally from symbols that have been transmitted non-orthogonally the term superposed symbol is introduced to refer to symbols that are transmitted non-orthogonally, i.e. overlapped within a single time/frequency/space RE. Thus, symbols or data symbols that have been superposed within a single RE for non-orthogonal transmission are referred to herein using the term superposed symbols. A successive interference cancellation (SIC) type receiver can be used to successively detect/decode and cancel signals of other higher power users whose symbols or data overlap and interfere with the desired data. SIC removes these interfering symbols and reveals the data, or superposed symbols, belonging to the receiving UE. Higher power users are users whose superposed symbols are transmitted at a higher power within the same non-orthogonal data signal and are also referred to herein as interfering users. For example in a set of users grouped together for NOMA transmission, i.e. in a superposition group, data for the user with the weakest radio link, i.e. the lowest channel gain, may be transmitted with the greatest power. Transmit power for the remaining users in the superposition group is assigned in order of descending channel gain so symbols for the user with the greatest channel gain are transmitted with the lowest transmit power. Upon receiving the signal, a UE can successively detect, and optionally decode, then cancel data signals transmitted at a higher power, i.e. cancel signals of interfering users, to reveal its own data.

The use of OFDMA with superposition/cancellation, i.e. NOMA, has been proposed as a radio access technology for future radio access systems. Such a system could continue to encode data as a set of complex symbols as is done in conventional OFDMA systems and achieve link adaptation with adaptive modulation and coding (AMC), similar to conventional LTE based systems. NOMA could be incorporated through the use of multi-user power allocation as described above.

NOMA has the potential to significantly improve the spectral efficiency of a wireless system and provide improved throughput and QoE. However, these benefits come at the cost of increases in receiver complexity and increased signaling requirements between the base station and the UE.

In conventional LTE based systems, signaling or control information is sent from a base station to a UE over a physical downlink control channel (PDCCH). The PDCCH may be used to send downlink control information (DCI), such as the parameters necessary to decode data being sent to the UE over the physical downlink shared channel (PDSCH), from a base station to the UE. When desired this decoding information can be sent dynamically within each transmission time interval. In conventional systems, such as LTE, there are several DCI formats available and are selected as necessary to keep DCI transmission overhead reasonably small so they may be transmitted dynamically or on a per transmission time interval (TTI) bases. Some of the more common information carried over the PDCCH using the various DCI formats is listed below:

Resource block assignment: a resource block (RB) is the smallest individually schedulable portion of the radio resources and comprises a plurality of resource elements. A resource element (RE) is the smallest usable portion of the radio spectrum and has dimensions of time and frequency. The resource block assignment indicates the position of RE within the RB allocated to the particular UE.

Modulation and Coding Scheme (MCS): the MCS is often sent as an index value, which may be referred to as a channel quality indicator (CQI) index, where each index value is assigned to a predetermined modulation scheme, such as 16 symbol quadrature amplitude modulation (16QAM) and a code rate which defines the number of redundancy bits used during channel coding. In many conventional wireless systems binary data is transmitted by converting or modulating it as a set of complex symbols selected form a modulation alphabet where each symbol is assigned a predefined bit sequence. These symbols are then transmitted via the wireless interface to a receiver that detects each symbol and converts it back to its binary sequence.

New Data Indicator (NDI): used for hybrid automatic repeat requests (HARQ).

Precoding Matrix Indicator (PMI) and Rank Index (RI): used to select the precoding matrix and specify the rank for spatial multiplexing with multiple antennas.

The CQI index may be derived by the UE and reported back to the base station based on for example measurements of the downlink reference signals. The CQI reporting is configured by the base station through radio resource control (RRC) signaling sent to a UE when it first connects to a base station.

Combining conventional orthogonal transmission technologies with NOMA techniques can significantly increase the amount of signaling necessary between a base station and the UE to which it is sending data. Adding this signaling to existing DCI structures can burden a communication system with a large amount of signaling thereby reducing the radio resources available for data transmission and reducing the data throughput. Thus there is a need for improved methods and apparatus for signaling NOMA information that avoid adversely impacting data throughput.

SUMMARY

It is an object of the present invention to provide apparatus and methods for signaling non-orthogonal transmissions in a wireless communication system that reduces the control channel overhead associated with non-orthogonal transmissions. A further object of the present invention is to provide methods and apparatus for signaling non-orthogonal transmissions that are appropriate and easily retrofit into conventional wireless communication systems.

According to a first aspect of the present invention the above and further objects and advantages are obtained by an apparatus for receiving superposed symbols. The apparatus includes a processor configured to determine a first superposed symbol from a plurality of superposed symbols, based on superposition information and a first set of decoding information, wherein the first superposed symbol corresponds to a first user equipment. The processor generates a residual signal based on the first superposed symbol and the superposition information, and determines a second superposed symbol based on the residual signal and a second set of decoding information, wherein the second superposed symbol corresponds to a second user equipment. The superposition information comprises a quantity of the plurality of superposed symbols and an ordering of the plurality of superposed symbols. This advantageously enables retrofitting non-orthogonal transmissions into existing communication networks based on conventional orthogonal transmissions.

In a first possible implementation form of the apparatus according to the first aspect the apparatus includes a receiver. The receiver is configured to receive, prior to a transmission time interval, the superposition information, and receive, during the transmission time interval, the plurality of superposed symbols. The receiver receives a superposition flag with a truth value during the transmission time interval or prior to the transmission time interval. This reduces the amount of necessary control signaling.

In a first possible implementation form of the apparatus according to the first possible implementation form of the first aspect the superposition flag occupies one bit. This allows providing a superposition flag without any additional control signalling overhead.

In a second possible implementation form of the apparatus according to the first aspect the apparatus includes a receiver configured to receive, prior to a transmission time interval, a plurality of superposition information and to receive, during the transmission time interval, the plurality of superposed symbols. The apparatus is further configured to receive, during the transmission time interval, a superposition indicator, wherein the superposition indicator includes a first index value corresponding to the first user equipment and a second index value corresponding to the second user equipment. The processor is configured to select the superposition information used for determining the first superposed symbol from the plurality of superposition information. This allows the decoding instructions that are known in advance to be included in the UE software and enables more efficient algorithms to be employed.

In a first possible implementation form of the apparatus according to the second possible implementation form of the first aspect the receiver is further configured to receive, prior to the transmission time interval, a plurality of sets of decoding information. The processor is further configured to select the first set of decoding information from the plurality of sets of decoding information based on the first index value and to select the second set of decoding information from the plurality of sets of decoding information based on the second index value. This can reduce the amount of dynamic signaling required and provide information on the quantity of users.

In a third possible implementation form of the apparatus according to the first aspect as such or to any of the preceding possible implementation forms of the first aspect the receiver is configured to receive the first set of decoding information and the second set of decoding information during the transmission time interval or prior to the transmission time interval. The amount of dynamic signaling can be reduced by receiving decoding information in a semi-static fashion.

In a fourth possible implementation form of the apparatus according to the first aspect as such or to any of the preceding possible implementation forms of the first aspect the receiver is further configured to receive the second set of decoding information during the transmission time interval or prior to the transmission time interval. The processor is configured to determine the first set of decoding information based on the second set of decoding information and a decoding instruction. The amount of signaling can be reduced by determining decoding information for some of the superposed symbols based on assumptions provided to the UE in the form of behavioral rules referred to as decoding instructions.

In a first possible implementation form of the apparatus according to the fourth possible implementation form of the first aspect the decoding instruction that instructs part of the first set of decoding information is reused as the second set of decoding information. This allows the UE to be pre-configured with decoding instructions or rules that are used by the UE to determine decoding information from previously received decoding information.

In a fifth possible implementation form of the apparatus according to the first aspect as such or to any of the preceding implementation forms of the first aspect the first set of decoding information and the second set of decoding information are pre-defined. Implementing decoding instructions this way allows for more efficient algorithms to be employed.

In a sixth possible implementation form of the apparatus according to the first aspect as such or to any of the preceding implementation forms of the first aspect the superposition information includes a first power ratio indicating a transmit power of the first superposed symbol, and the processor is further configured to generate the residual signal based on the first power ratio.

In an seventh possible implementation form of the apparatus according to the first aspect as such or to any of the preceding possible implementation forms of the first aspect the superposition flag is received during the transmission time interval or prior to the transmission time interval.

In an eighth possible implementation form of the apparatus according to the first aspect as such or to any of the preceding possible implementation forms of the first aspect the first set of decoding information and the second set of decoding information is received prior to transmission time interval.

According to a second aspect of the present invention the above and further objects and advantages are obtained by an apparatus that includes a receiver configured to receive a plurality of channel gains prior to a transmission time interval, wherein each channel gain in the plurality of channel gains corresponds to a radio link in a plurality of radio links, wherein each radio link is between a user equipment and the apparatus. The apparatus also includes a processor configured to select, prior to the transmission time interval, a first radio link between a first user equipment and the apparatus, and a second radio link between a second user equipment and the apparatus, from the plurality of radio links, based on the plurality of channel gains. The apparatus includes a transmitter configured to transmit, prior to the transmission time interval, a superposition information and to transmit, during the transmission time interval, a plurality of superposed symbols including a first superposed symbol corresponding to the first radio link and a second superposed symbol corresponding to the second radio link. The superposition information includes a quantity of the plurality of superposed symbols and an ordering of the plurality of superposed symbols.

According to a first possible implementation form of the apparatus according to the second aspect the transmitter is further configured to transmit a superposition flag with a truth value during the transmission time interval or prior to the transmission time interval.

According to a second possible implementation form of the apparatus according to the second aspect, the transmitter is further configured to transmit a plurality of superposition information and transmit a superposition flag during the transmission time interval, wherein the superposition flag comprises a first index value corresponding to the first user equipment and a second index value corresponding to the second user equipment.

According to a third possible implementation form of the apparatus according to the second aspect, or any one of the preceding implementation forms of the second aspect, the transmitter is further configured to transmit, a second set of decoding information corresponding to a second superposed symbol, during the transmission time interval or prior to the transmission time interval; or transmit, during the transmission time interval or prior to the transmission time interval, a first set of decoding information corresponding to a first superposed symbol, and the second set of decoding information corresponding to a second superposed symbol.

According to a first possible implementation form of the third possible implementation form of the apparatus according to the second aspect, wherein the decoding instruction instructs part of the first set of decoding information is reused as the second set of decoding information.

According to a second possible implementation form of the third possible implementation form of the apparatus according to the second aspect or the first possible implementation form of the third possible implementation form of the apparatus according to the second aspect the first set of decoding information and the second set of decoding information are pre-defined.

According to a fourth possible implementation form of the second aspect, or to any one of the preceding possible implementation forms of the second aspect, the superposition information comprises a first power ratio indicating a transmit power of the first superposed symbol, and the processor is further configured to generate the residual signal based on the first power ratio.

According to a third aspect of the present invention the above and further objects and advantages are obtained by a method for receiving superposed symbols. The method includes determining a first superposed symbol from a plurality of superposed symbols, based on superposition information and a first set of decoding information, wherein the first superposed symbol corresponds to a first user equipment. The method generates a residual signal based on the first superposed symbol and the superposition information, and determines a second superposed symbol based on the residual signal and a second set of decoding information, wherein the second superposed symbol corresponds to a second user equipment. The superposition information comprises a quantity of the plurality of superposed symbols and an ordering of the plurality of superposed symbols. This advantageously enables retrofitting non-orthogonal transmissions into existing communication networks based on conventional orthogonal transmissions.

According to a first possible implementation of the method according to the third aspect, the method includes receiving, prior to a transmission time interval, the superposition information, and during the transmission time interval, the plurality of superposed symbols. A superposition flag with a truth value is received during the transmission time interval or prior to the transmission time interval. This can be desirable to reduce the amount of dynamic signaling.

In a first possible implementation form of the method according to the first possible implementation form of the third aspect the superposition flag occupies one bit. This allows providing a superposition flag without any additional control signalling overhead.

In a second possible implementation form of the method according to the third aspect the method includes receiving, prior to a transmission time interval, a plurality of superposition information and receiving, during the transmission time interval, the plurality of superposed symbols. The method further includes receiving, during the transmission time interval, a superposition indicator, wherein the superposition indicator includes a first index value corresponding to the first user equipment and a second index value corresponding to the second user equipment. The method includes selecting the superposition information used for determining the first superposed symbol from the plurality of superposition information.

In a first possible implementation form of the method according to the second possible implementation form of the third aspect, the method includes receiving, prior to the transmission time interval, a plurality of sets of decoding information. The method further includes selecting the first set of decoding information from the plurality of sets of decoding information based on the first index value and selecting the second set of decoding information from the plurality of sets of decoding information based on the second index value.

In a third possible implementation form of the method according to the third aspect as such or to any of the preceding first and second possible implementation forms of the third aspect the method includes receiving the first set of decoding information and the second set of decoding information during the transmission time interval or prior to the transmission time interval.

In a fourth possible implementation form of the method according to the third aspect as such or to any of the preceding possible implementation forms of the third aspect the method further includes receiving the second set of decoding information during the transmission time interval or prior to the transmission time interval. The method includes determining the first set of decoding information based on the second set of decoding information and a decoding instruction.

In a first possible implementation form of the method according to the fourth possible implementation form of the first aspect wherein the decoding instruction instructs part of the first set of decoding information is reused as the second set of decoding information.

In a fifth possible implementation form of the method according to the third aspect as such or to any of the preceding implementation forms of the third aspect the first set of decoding information and the second set of decoding information are pre-defined.

In a sixth possible implementation form of the method according to the third aspect as such or to any of the preceding implementation forms of the third aspect the superposition information includes a first power ratio indicating a transmit power of the first superposed symbol, and the method includes generating the residual signal based on the first power ratio.

According to a fourth aspect of the present invention the above and further objects and advantages are obtained by a method for transmitting superposed symbols. The method includes determining a plurality of channel gains prior to a transmission time interval, wherein each channel gain in the plurality of channel gains corresponds to a radio link in a plurality of radio links. A first radio link and a second radio link are selected prior to the transmission time interval, from the plurality of radio links, based on the plurality of channel gains. A superposition information is transmitted prior to the transmission time interval, and during the transmission time interval, a plurality of superposed symbols comprising a first superposed symbol corresponding to the first radio link and a second superposed symbol corresponding to the second radio link is transmitted. The superposition information includes a quantity of the plurality of superposed symbols and an ordering of the plurality of superposed symbols.

According to a first possible implementation form of the fourth aspect, the method includes transmitting a superposition flag with truth value during the transmission time interval or prior to the transmission time interval.

According to a second possible implementation form of the fourth aspect, the method includes transmitting a plurality of superposition information and transmitting a superposition indication during the transmission time interval, wherein the superposition indication comprises a first index value corresponding to the first user equipment and a second index value corresponding to the second user equipment.

According to a third possible implementation form of the fourth aspect or any one of the previous possible implementation forms of the fourth aspect, the method includes transmitting a second set of decoding information corresponding to a second superposed symbol during the transmission time interval or prior to the transmission time interval; or transmitting, during the transmission time interval or prior to the transmission time interval, a first set of decoding information corresponding to a first superposed symbol, and the second set of decoding information corresponding to a second superposed symbol.

According to a first possible implementation form of the third possible implementation form of the fourth aspect, the method includes transmitting a decoding instruction wherein the decoding instruction instructs part of the first set of decoding information is reused as the second set of decoding information.

According to a second possible implementation form of the third possible implementation form of the fourth aspect or the first possible implementation form of the third possible implementation form of the fourth aspect, the first set of decoding information and the second set of decoding information are pre-defined.

According to a fourth possible implementation form of the fourth aspect, or any of the preceding possible implementation forms of the fourth aspect, the superposition information comprises a first power ratio indicating a transmit power of the first superposed symbol; and the processor is further configured to generate the residual signal based on the first power ratio.

According to a fifth aspect of the present invention the above and further objects and advantages are obtained by a radio access network that includes an apparatus according to the first aspect as such or to any of the possible implementation forms of the first aspect.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which.

DETAILED DESCRIPTION OF THE DISCLOSED EMBODIMENTS

When transmitting data using non-orthogonal techniques, the users scheduled to receive superposed symbols require sufficient control signaling to determine when non-orthogonal transmission is being used, and how to separate the desired data, or superposed symbols, from the data or superposed symbols of interfering users. The control signaling needs to include not only information necessary to detect and decode the desired data, but also needs to include information for detecting and decoding the data of interfering users and additionally information about how the superposed symbols have been overlapped or superimposed. This additional control signaling is required to support successive interference cancellation of interfering superposed symbols in order to recover the desired data.

Information needed for decoding non-orthogonal signals includes two types of information. Information about how data is superposed is referred to herein as superposition information and includes items such as the ordering of interfering users and the power ratio used when transmitting interfering symbols. Information about how to detect and decode the superposed symbols is referred to herein as decoding information and includes information such as modulation order and coding rate. Depending on the application scenario, a large volume of decoding information may be required for determination of the desired superposed symbols, especially when different transmission parameters are employed for different users in the superposition group. Examples of some of the decoding parameters available in conventional OFDMA networks such as those based on the LTE standards was described above and may include resource block assignments, MCS, RI, PMI, exact position of the RE used to map encoded superposed symbols, antenna port information used when transmitting desired or interfering superposed symbols, and in some cases radio network temporary identifier (RNTI) as well as many other parameters that are used to encode, pre-code or map superposed symbols in the transmitter.

As discussed above, enabling non-orthogonal transmissions often results in an undesirable amount of control signaling to each user in the superposition group. Control signaling uses radio resources that could otherwise be used for data transmission thereby reducing the achievable data rates, and excessive control signaling also makes retrofitting non-orthogonal transmission into existing radio networks difficult. It is therefore desirable to find methods that can reduce the amount of necessary control signaling. In an exemplary embodiment of a method for signaling control information, a UE can be provided with a pre-defined set of decoding instructions that can be used to make assumptions about some of the decoding parameters. For example, when a full set of decoding parameters are not provided, a UE can assume that it uses the same decoding parameters as an interfering UE, for example: the UE may assume that the interfering UE is using the same RBs; using the same demodulation reference signal (DMRS) antenna ports, using the same common reference signal (CRS) antenna ports or at least ports which use the same RE; using the same number of spatial layers, as well as other assumptions or decoding instructions may be used. It is often the case where UE behavior is defined in a specification with various assumptions the UE should make when determining decoding information. When these UE behaviors referred to herein as decoding instructions are defined in a specification or otherwise known in advance it may be advantageous to include these behaviors as business logic hard coded into the UE software. Implementing decoding instruction in this way has the advantage of allowing more efficient algorithms to be employed by software developers.

Alternatively control signaling may be reduced by making assumptions about the rate matching of interfering users. For example, the UE can assume that mapping around all the possible positions related to DMRS, CRS and/or zero power (ZP) and non-zero power channel state information-reference signals (NZP CSI-RS) are performed even when they are not all used. This eliminates the need to signal RE positions occupied by these user specific parameters.

It should be noted that in certain embodiments it is beneficial to signal some information even when it could otherwise be determined by decoding instructions or assumptions. In embodiments where signaling is desired information may be signaled dynamically within each TTI or information may be signaled in a semi-static fashion where information is signaled using other control channels such as in a radio resource control (RRC) block or a system information block (SIB). Alternatively, some information may be obtained through blind detection. Dynamic and semi-static signaling will be described in more detail below.

As an aid to understanding certain of the embodiments described herein are described using terminology consistent with conventional wireless system such as LTE or LTE-A, however those skilled in the art will readily recognize that the disclosed embodiments are not so limited and may be used either directly or with design changes in other conventional and future radio access systems and with FRA technologies.

As used herein the term transmission time interval or TTI is the time taken to transmit one block of data and is related to encapsulation of data from higher layers into frames or data blocks for transmission over the wireless radio link. Data from higher layers is packaged into blocks then encoded and interleaved before being modulated onto the selected symbol set. The time used to transmit one block of encoded data is referred to as a TTI. For example in a conventional universal mobile telecommunication system (UMTS) release 99 the smallest TTI is 10 milliseconds (ms) but may also be 20 ms, 40 ms, or 80 ms. In a conventional LTE system the TTI is about 1 ms. The size of a TTI is selected based on a tradeoff where shorter TTI provides faster link adaptation, and longer TTI can improve encoding efficiency such as with error correction. Those skilled in the art will recognize that the apparatus and methods disclosed herein may be applied in systems with any size TTI without straying from the spirit and scope of the disclosed embodiments.

Consider retrofitting non-orthogonal transmissions into an existing OFDMA based wireless communication network. This is desirable because it offers significant increases in throughput of existing UE and network resources while being suitable for implementation in conventional systems designed to support orthogonal transmission. Existing or conventional networks, such as networks implementing a 3GPP LTE type system, typically provide different legacy signaling for the various transmission modes supported by the network. However, many conventional networks do not have enough unused control signaling to dynamically signal all the required information. Thus in certain embodiments a combination of dynamic signaling using the legacy control signals can be used in conjunction with semi-static signaling for additional information that does not fit within the existing dynamic control signaling. For example a UE could be signaled dynamically using existing control channels that it is scheduled to receive non-orthogonal transmissions in the current TTI. The remaining parameters could be signaled ahead of time semi-statically or otherwise pre-configured in the UE and used to for decoding whenever non-orthogonal transmissions have been signaled in a TTI. More generally, an exemplary embodiment can dynamically signal a portion of the superposition and/or decoding information in each TTI and signal the remaining superposition and decoding information less often. Signaling information during every TTI is referred to herein as dynamic signaling and signaling information less often than with every TTI is referred to herein as semi-static signaling. Information signaled semi-statically is referred to as semi-static information. Dynamic control signaling is limited in conventional networks so adding new dynamically signaled information is limited, however semi-static signaling can be more easily retrofit into conventional wireless networks.

For example in an LTE based network the semi-static information could be sent to UE when they connect to a network by adding to the radio resource control (RRC) signaling. Alternatively semi-static information could be retrofit into system information blocks (SIB) or other existing control channel resources.

Figure 1:
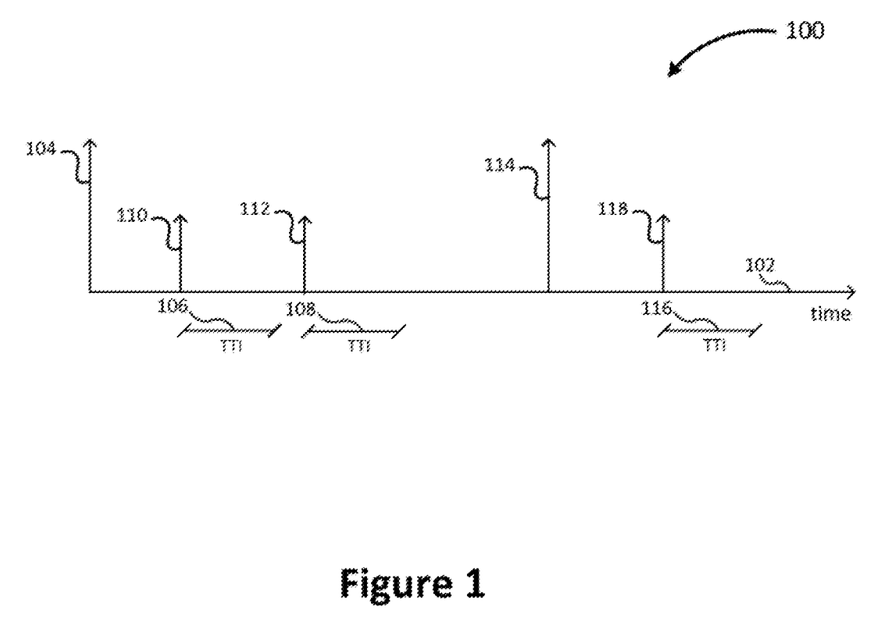
FIG. 1 illustrates a timeline showing an embodiment of signaling for non-orthogonal transmissions incorporating aspects of the disclosed embodiments.

FIG. 1 shows a timeline 300 illustrating how semi-static signaling can be combined with dynamic signaling to support NOMA in a conventional wireless system. In the timeline 100, time is depicted along the horizontal axis 102. Semi-static information such as the MCS of the interfering UE, decoding parameters, power ratio, ordering and other UE specific information, is signaled at a time 104 prior to the TTI 106, 108 in which it is needed. The signaling of semi-static information may be done for example in a conventional LTE system when the UE connects to the network in a control channel such as the RRC or more frequently using a SIB or other regularly transmitted control signal. NOMA can be dynamically activated on per TTI basis by signaling a superposition indicator at the start 110, 112 of each TTI 106, 108 in which superposed symbols are transmitted. Semi-static information can be updated if desired at regular or intermittently by sending 114 updated semi-static information. Use of the updated semi-static information is then enabled during subsequent TTI 116 by signaling a superposition indicator at the beginning 118 of the TTI 116 in which superposed transmission is being done.

Figure 2:
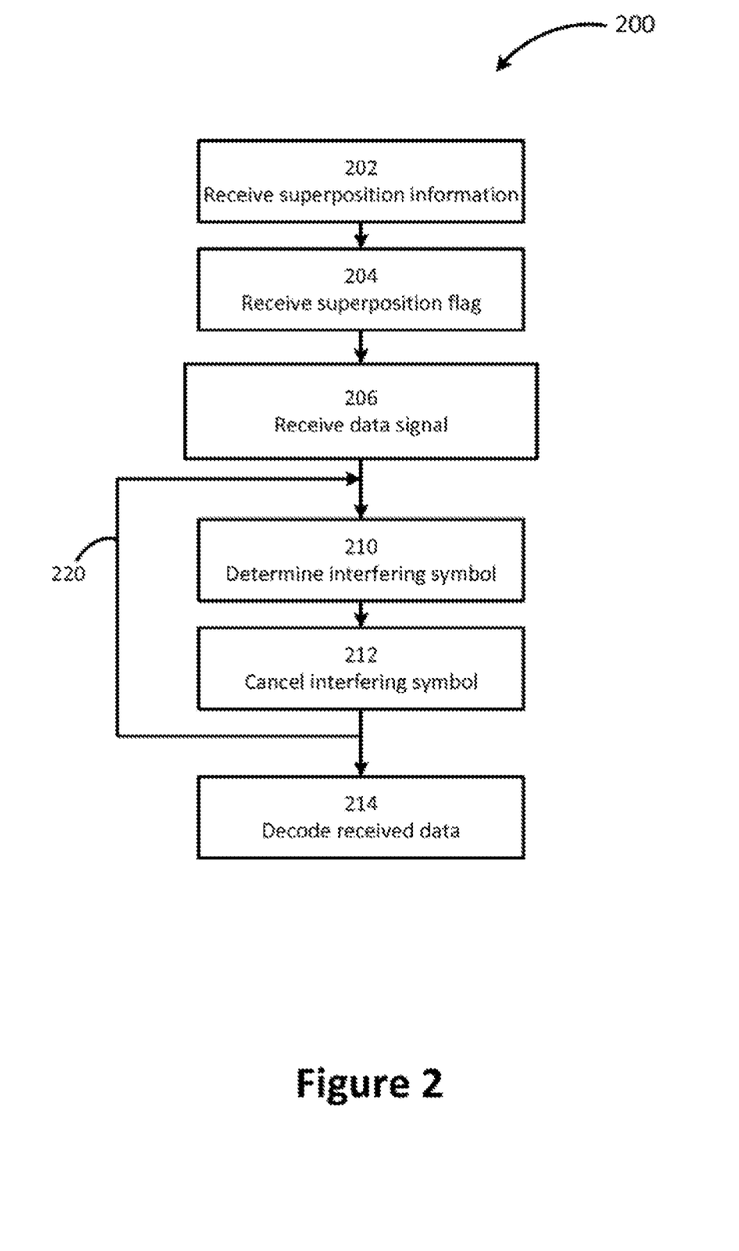
FIG. 2 illustrates an flowchart of a method for receiving non-orthogonal transmissions incorporating aspects of the disclosed embodiments.

FIG. 2 illustrates a flow chart of an exemplary embodiment of a method 200 for semi-static signaling of non-orthogonal transmissions in a wireless network. The exemplary method 200 is appropriate for retrofitting non-orthogonal transmissions into existing communication networks based on conventional orthogonal transmissions. The exemplary method 200 begins prior to the TTI for which decoding is being performed in a step 202 where a set of superposition information is received. The received set of superposition information includes parameters and other information necessary to separate superposed symbols transmitted non-orthogonally in a TTI. The set of superposition information may be replaced or updated by the base station at any time using semi-static signaling, however since conventional networks do not typically include enough unused dynamic signaling to signal the full set of superposition information, updating the set of superposition information will be accomplished less that at every TTI. During, or alternatively just prior to, each subsequent TTI step 204 receives a superposition indicator. In certain embodiments, such as when enhancing legacy DCI to support non-orthogonal transmissions, it is desirable to reduce the amount of dynamic signaling as much as possible. In these embodiments the superposition indicator may be reduced to a single truth value or superposition flag which may be transmitted as a single binary bit. The superposition indicator, which in certain embodiments is a single bit superposition flag, is received 204 dynamically during or prior to each TTI including superposed symbols and provides an indication that the TTI includes superposed symbols.

When retrofitting non-orthogonal transmission into a conventional orthogonal network, the superposition indicator may be signaled using unused states in the dynamic control signals. For example in a conventional communication system supporting carrier aggregation component carriers can be indicated by a carrier indicator field (CIF). Since it is often the case that the number of component carriers supported is not a power of two, there may be an unused bit in the CIF available for use as a superposition flag. Alternatively consider a conventional 3GPP LTE system where a 3-bit CIF is configured in PDCCH to signal downlink component carriers. These systems allow aggregation of up to five component carriers, leaving three unused states of the CIF that can be exploited to provide a superposition indicator for enabling non-orthogonal transmission in an LTE system without any additional control signalling overhead. Other dynamic control information signals may be exploited in a similar fashion to provide dynamic signalling of the superposition indicator or superposition flag.

A superposition flag is a simple two state signal such as a single bit used to indicate the presence or lack of superposed symbols in the data signal. In certain embodiments the available dynamic control signalling allows for additional information to be signalled, the term superposition indicator refers signalling that includes a flag as well as additional dynamic information.

At step 206 a data signal belonging to the current TTI is received. The data signal includes at least a first superposed symbol corresponding to or belonging to a first UE and a second superposed symbol corresponding to a second UE. The first superposed symbol is determined at step 210 based on the semi-statically signaled set of superposition information and a first set of decoding information. When the UE performing the method 200 is the first UE, the data recovered in step 210 is the desired data corresponding the UE, thus there is no need to continue with the cancellation and subsequent determination steps in the this UE. In certain embodiments it is desirable for all superposed symbols corresponding to the first user within a TTI to be determined and fully decoded to obtain better symbol estimates before moving on to the cancellation step 212. The first superposed symbol that was determined at step 210 is used in a cancellation step 212 to generate a residual signal. When there are more than one symbols interfering with the second desired symbol, such as when the superposition group includes more than two UE, the determination step 210 and the cancellation step 212 are repeated 220 for each interfering symbol, i.e. for each symbol that was transmitted with a higher power than the desired symbol. The second superposed symbol can then be determined at step 214 based on the residual signal. The set of superposition information provides information necessary for the SIC receiver to separate the superposed symbols such as the order, i.e. transmit power order, of the superposed symbols, and the quantity of superposed symbols. In certain embodiments the set of superposition information may also include transmit power ratios for the superposed symbols.

It is often beneficial for the first and second set of decoding information to be received dynamically in each TTI. However control signaling may not be available to signal multiple sets of decoding information dynamically. When this is the case one set of decoding information for one superposed symbol may be signaled dynamically in each TTI and additional decoding information for the remaining superposed symbols may be determined from the dynamically signaled set of decoding information. Alternatively more than one set of decoding information corresponding to more than one superposed symbol may be signaled dynamically and decoding information for any remaining superposed symbols may be determined from the already received sets of decoding information. Determination the missing sets of decoding information may be done based on assumptions made at the UE. These assumptions are referred to as decoding instructions and may be pre-configured in the UE. It is likely that future radio access standards will define these assumptions as part of the specified UE behaviors. Alternatively, the decoding instructions could be updated in semi-statically when different UE behaviors are desired. The decoding instructions could be for example to use the same decoding information for all superposed symbols when only one set of decoding information is signaled. In certain embodiments one or more sets of decoding information may be pre-configured in a UE. When this is done, the desired set of decoding information may be selected via the superposition flag or alternatively it may be determined through UE behaviors corresponding to the decoding instructions.

Figure 3:
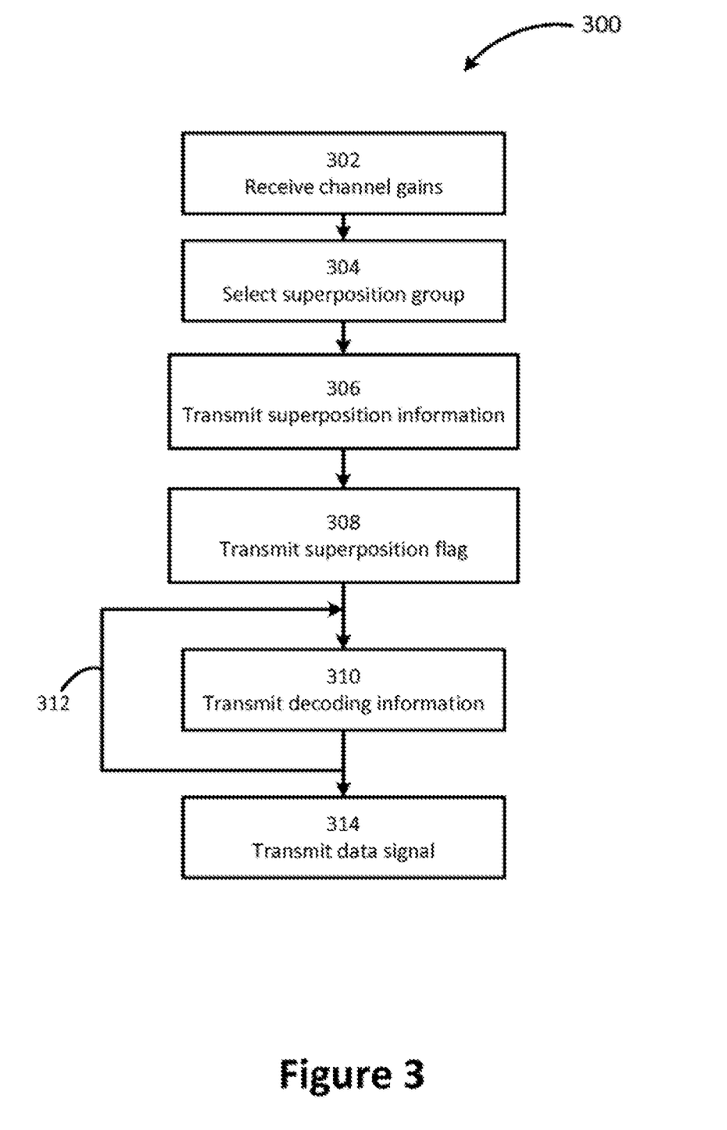
FIG. 3 illustrates a flowchart of a method for transmitting non-orthogonal signals incorporating aspects of the disclosed embodiments.

FIG. 3 illustrates a flow chart of an exemplary embodiment of a method 300 for transmitting non-orthogonal data in a wireless communication network. The method 300 is appropriate for transmitting data to a UE or receiver configured to receive data according to the receiver method 200 embodiments described above and with reference to FIG. 2. A transmitter implementing method 300 begins at step 302 by determining a set of channel gains associated with the radio links between the transmitter and each of the UE to which it is transmitting data. The channel gains may be derived from channel information (CSI) received from each UE over a control channel such as the physical uplink control channel (PUCCH) used in an LTE network. Alternatively, the channel gains may be estimated based on other signals received from each UE, for example an analysis of the physical uplink shared channel (PUSCH) transmission can be used to estimate the channel gains of each radio link. The transmitter will select at step 304 two or more UE to be grouped for non-orthogonal transmissions based on the channel gains determined at step 302. The selected group of UE or receivers, referred to as a superposition group, will typically include radio links with variations in channel gains appropriate for supporting successive detection and cancellation at the receiver. A set of superposition information is transmitted at step 306 to each UE over the associated radio link. The superposition information includes information and parameters necessary for a receiver or UE to separate its own data or superposed symbols from the other superposed symbols of other users in the superposition group. The set of superposition may include information providing the order, i.e. transmission power ordering, of the superposed symbols, and the quantity of superposed symbols. It is also desirable in certain embodiments to include the transmission power ratio used for each superposed symbol. During the TTI in which non-orthogonal transmissions are used a superposition indicator is sent at step 308 to indicate to each UE in the superposition group that superposed symbols should be expected in RE within the TTI. Alternatively the superposition indicator may be sent prior to the TTI as long as it is clear which TTI contains the superposed symbols. The superposition indicator may be a simple flag used to indicate the presence of non-orthogonal transmissions or alternatively the superposition indicator may include additional information such as an index value to aid determination of associated superposition and decoding information. At step 310 decoding information for each of the superposed symbols is transmitted over each radio link to each receiver. In addition to a set of decoding information for its own superposed symbols each receiver will also need to have access to decoding information for all interfering superposed symbols, i.e. superposed symbols that have been transmitted with higher power. When this is the case step 310 may be repeated 312 for each additional set of decoding information required by a UE based on the quantity and ordering of the superposed symbols being transmitted. The decoding information transmitted at step 310 may be sent during the TTI or alternatively it may be transmitted prior to the TTI. The transmitter then sends the data signal at step 314. The data signal in the current TTI includes a quantity of superposed symbols where each superposed symbol is targeted for a particular UE in the superposition group.

The methods and apparatus described above are most advantageous when retrofitting non-orthogonal transmission techniques into existing or conventional communication networks. When creating new communication networks it is beneficial to create new DCI formats specifically adapted for signaling information for supporting NOMA. As discussed above increasing the amount of dynamic signaling proportionately reduces the amount of data that can be transmitted so it is desirable to keep the amount of dynamic signaling to a minimum. In one embodiment a single bit could be added to the dynamically signaled DCI formats to enable or trigger a user to receive non-orthogonal transmissions. The remaining superposition and decoding parameters could be pre-configured in the UE in a semi-static fashion or determined through blind detection. For example in a LTE system, superposition information and decoding information can be pre-configured semi-statically using RRC signaling or transmitted as part of the system information in a SIB. A new DCI format can then be used to dynamically signal a superposition indicator that identified the pre-configured information that should be used for decoding and SIC in each TTI.

The sets of pre-configured superposition information may include a set of power ratio values used when transmitting the superposed symbols. For example each power ratio value could denote the fraction of the total downlink transmission power used for each superposed symbol. The pre-configured sets of decoding information could include a set of possible MCS values corresponding to different combinations of non-orthogonally multiplexed users; and a set of time-frequency resources used for non-orthogonal transmission.

Ordering of users, which is typically determined by the transmitter based on the channel gains of each UE, is best signaled dynamically since the channel gains are often subject to fairly rapid variations. A system user can then determine based on the ordering if the received parameter should be used for decoding its own signal, such as when it is first on the list, or should be used to remove interference from other users considering the ordering.

In an exemplary embodiment a network transmitter sends to each UE a downlink control signal indicating a set of one or more indices. The set of indices identify the pre-configured superposition information to be used to recover data from the non-orthogonal transmission and can identify the actual combination of parameters associated with the superposition group for one or more TTI. Each set of pre-configured parameters may be implicitly or explicitly associated with a quantity of users scheduled to receive superposed symbols. Thus, when a user receives dynamic control signaling with indices indicating a set of parameters, the user is implicitly made aware of the quantity of users concurrently scheduled for non-orthogonal transmission in the same time-frequency resources. An additional advantage of implicitly signaling the quantity of users is a reduction in the amount of dynamic signaling required. The pre-configured superposition information can be organized as tables that provide power ratios used when transmitting the superposed symbols. For example, Table 1 provides power ratios for use when the superposition group includes two users. When a user in the superposition group receives an index associated with Table 1 the user is implicitly informed that the quantity of superposed symbols is equal to 2 and also obtains a power ratio value $\beta$. A single power ratio value $\beta$ is sufficient for 2 users by including a pre-configured rule in the UE where one superposed symbol is transmitted with a portion of the total power corresponding to the given power ration value $\beta$ and the other superposed symbol is transmitted with a portion of the total transmit power equal to $1-\beta$.

TABLE 1

| Index | Power ratio value $\beta$ |
|---|---|
| 0 | 0.1 |
| 1 | 0.2 |
| 2 | 0.3 |
| 3 | 0.4 |

When the superposition group includes three users the transmitted index value will correspond to a table such as Table 3 that provides power ratio values for three superposed symbols. Similar to Table 1, Table 2 includes only 2 power ratio values $\beta_1$, $\beta_2$ and the power ratio for the third user may be found as $1-\beta_1-\beta_2$. For example when a user receives a dynamically signaled index value of 4, the user is implicitly informed that the quantity of users in the superposition group is three because the index value corresponds to a row in the three user table, and the user may also obtain all three power ratio values from the two power ratio values $\beta_1$, $\beta_2$ provided by Table 2 by using the pre-defined rule described above.

TABLE 2

| Index | $\beta_1$ | $\beta_2$ |
|---|---|---|
| 4 | 0.8 | 0.1 |
| 5 | 0.7 | 0.2 |
| 6 | 0.6 | 0.2 |
| 7 | 0.6 | 0.1 |

Figure 4:
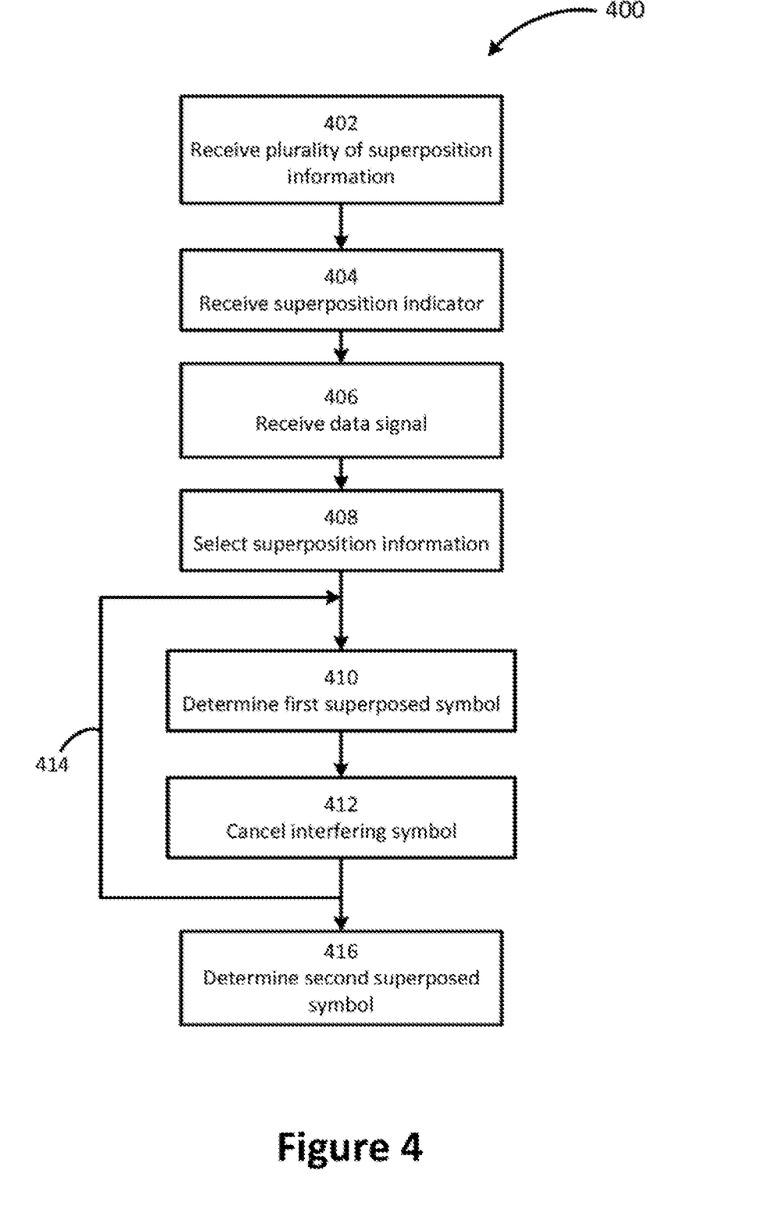
FIG. 4 illustrates a flowchart of a method for signaling of non-orthogonal transmissions incorporating aspects of the disclosed embodiments.

FIG. 4 illustrates a flow chart for an exemplary embodiment of a method 400 for signaling non-orthogonal transmissions using new DCI formats. The method 400 pre-configures the UE by receiving at step 402 a plurality of sets of superposition information such as the superposition information described above. The pre-configured superposition information may be sent at various times prior to the TTI in which it will be used using semi-static signaling as described above or it may be pre-configured in a more static methodology such as when a UE is provisioned. During the TTI where non-orthogonal transmission is being used, a superposition indicator is received at step 404. The superposition indicator includes one or more index values identifying the superposition information to be used when extracting data from the received data signal. In certain embodiments the superposition indicator includes as many index values as there are users in the superposition group and the set of index values indicates decoding information for each superposed symbol, etc. A data signal is received at step 406. The data signal includes superposed symbols where each superposed symbol corresponds to a user in the superposition group being services by the data signal. A set of superposition information is then selected at step 408 based on information provided by the superposition indicator. For example the superposition indicator may include an index value identifying a power ratio value as described above with respect to Table 1 and Table 2. At step 410 a superposed symbol is determined from the received data signal. The selected superposition information obtained in step 404 is used to identify which superposed symbol should be determined and a set of decoding information is used to detect the superposed symbol. When the determined superposed symbol contains the data desired by the UE there is no need to continue with any cancellation or subsequent detection steps. However, when the desired data is in a lower power superposed symbol additional cancellation/detection is required to obtain the desired data. The determined superposed symbol is cancelled form the data signal to generate a residual signal at step 412 thereby revealing the next lower power superposed symbol. The determination step 410 and cancellation step 412 are repeated 414 until all interfering superposed symbols have been removed from the data signal. The desired superposed symbol can then be determined at step 416 based on a corresponding set of decoding information.

The decoding information used to determine the superposed symbols may be received dynamically either during the TTI or prior to the TTI in which it is used. However, dynamic signaling of several sets of decoding information can lead to undesirable amounts of data resulting in reduced data throughput. The amount of dynamic signaling can be reduced by pre-configuring the UE with a plurality of sets of decoding information or alternatively receiving the plurality of sets of decoding information in a semi-static fashion as described above, and including index values in the superposition indicator to identify the specific sets of decoding information that should be used when decoding each superposed symbol. In certain embodiments the amount of signaling can be reduced by determining decoding information for some of the superposed symbols based on assumptions provided to the UE in the form of behavioral rules referred to as decoding instructions.

Figure 5:
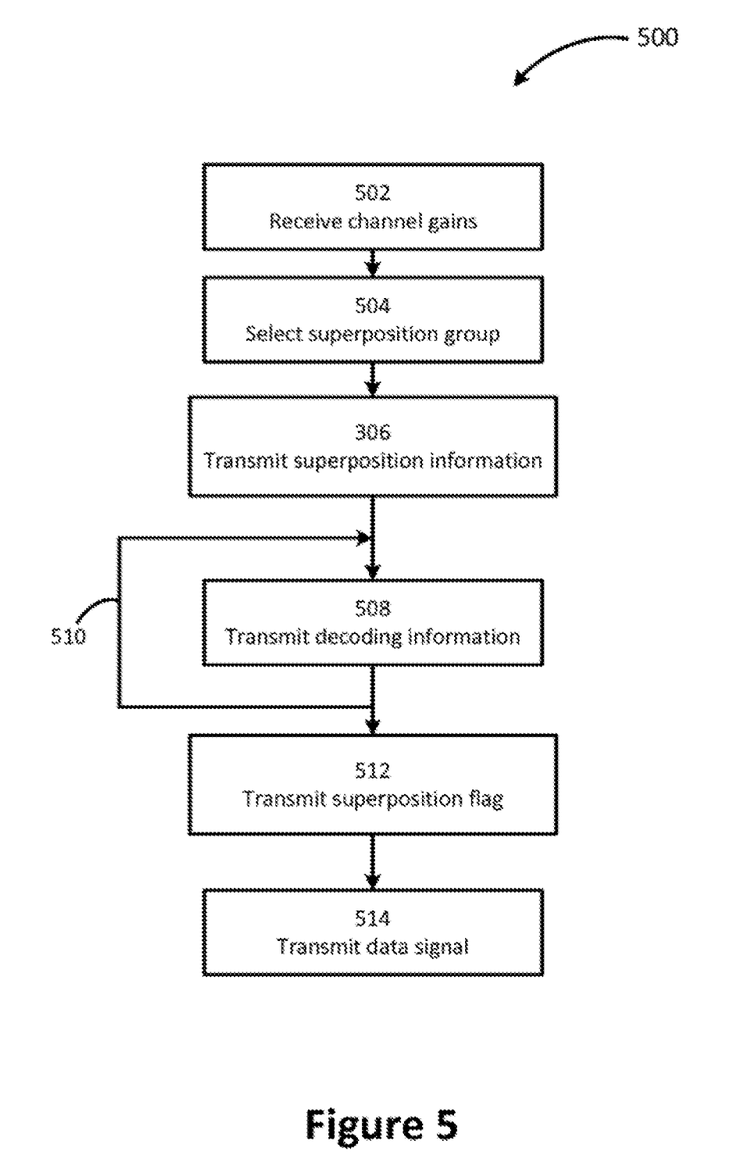
FIG. 5 illustrates a flowchart of a method for transmitting non-orthogonal data incorporating aspects of the disclosed embodiments.

FIG. 5 illustrates a flowchart of an exemplary method 500 used for signaling non-orthogonal transmissions in a wireless communication network. The method 500 begins by determining channel gains at step 502 for a plurality of radio links where each radio link corresponds to a UE being serviced by the transmitter. The channel gains may be received from each UE or may be determined by the transmitter from other information available to the transmitter. A group of users are then selected to receive non-orthogonal transmissions at step 504. The superposition group is selected based on the channel gains associated with each user in the superposition group. A plurality of superposition information is transmitted to each UE at step 506. The superposition information may be pre-configured in the UE or it may be sent using semi-static signaling as described above and is sent prior to the TTI in which it will be used by the UE. Decoding information is sent at step 508 to each UE either during or when desired prior to the TTI in which it is being used. In certain embodiments, a number of sets of decoding information is sent to each UE by repeating step 508 multiple times 510. Multiple sets of decoding information is desirable when different superposed symbols in the non-orthogonal signal have been modulated or encoded differently. A superposition indicator is then sent dynamically to each UE in the selected superposition group at step 512. The superposition indicator, as described above may include one or more index values identifying the set of pre-configured superposition information and decoding information to be used when extracting data from the non-orthogonal data signal. A non-orthogonal data signal with multiple superposed symbols is transmitted to each UE in the superposition group at step 514.

Several alternatives are available for transmitting the decoding formation to each of the UE in the superposition group. All sets of decoding information may be transmitted dynamically to the UE. This provides flexibility but results in a potentially large amount of dynamic control signaling which reduces the data throughput. Decoding information may be transmitted semi-statically to the UE and selected by including indices or other indicators in the dynamically signaled superposition indicator. When UE behavior is based on making assumptions about the decoding information, the UE can be pre-configured with decoding instructions or rules that are used by the UE to determine decoding information from previously received decoding information.

Figure 6:
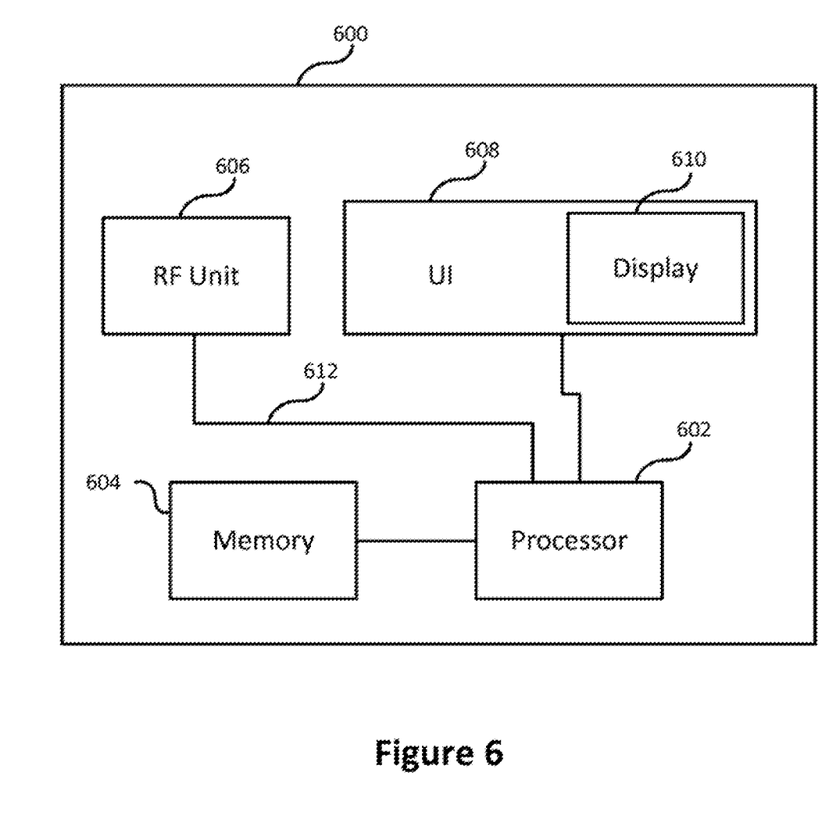
FIG. 6 illustrates a block diagram of an apparatus appropriate for practicing aspects of the disclosed embodiments.

FIG. 6 illustrates a block diagram of an apparatus 600 incorporating aspects of the present disclosure. The apparatus 600 is appropriate for implementing embodiments of the NOMA signaling processes described herein. The illustrated apparatus 600 includes a processor 602 coupled to a memory 604, a radio frequency (RF) unit 606, a user interface (UI) 608, and a display 610. The apparatus 600 may be a mobile device such as any of various types of wireless communications user equipment including cell phones, smart phones, or tablet devices. Alternatively the apparatus 600 may also be used as a transmitter such as in a base station. It may be desirable when using the apparatus 600 as a base station to remove the UI 608 and administer the apparatus 600 remotely via a network or other type of computer interface (not shown).

The processor 602 may be a single processing device or may comprise a plurality of processing devices including special purpose devices such as for example it may include digital signal processing (DSP) devices, microprocessors, or other specialized processing devices as well as one or more general purpose computer processors including parallel processors or multi-core processors. The processor is configured to perform embodiments of the NOMA signaling processes described below. The processor 602 is coupled to a memory 604 which may be a combination of various types of volatile and/or non-volatile computer memory such as for example read only memory (ROM), random access memory (RAM), magnetic or optical disk, or other types of computer memory. The memory 604 stores computer program instructions that may be accessed and executed by the processor 602 to cause the processor 602 to perform a variety of desirable computer implemented processes or methods including the NOMA signaling processes described herein. The program instructions stored in memory 604 may be organized as groups or sets of program instructions referred to by those skilled in the art with various terms such as programs, software components, software modules, units, etc., where each program may be of a recognized type such as an operating system, an application, a device driver, or other conventionally recognized type of software component. Also included in the memory 604 are program data and data files which may be accessed, stored, and processed by the computer program instructions.

The RF Unit 606 is coupled to the processor 602 and configured to transmit and receive RF signals based on digital data 612 exchanged with the processor 602. The RF Unit 606 is configured to transmit and receive radio signals that may conform to one or more of the wireless communication standards in use today, such as for example LTE, LTE-A, Wi-fi, or may be configured for future radio access techniques such as NOMA. The RF Unit 606 may receive radio signals from one or more antennas, down-convert the received RF signal, perform appropriate filtering and other signal conditioning operations, then convert the resulting baseband signal to a digital signal by sampling with an analog to digital converter. The digitized baseband signal also referred to herein as a digital communication signal is then sent 612 to the processor 602. In transmitter applications, the RF Unit 606 is configured to receive a digital information in the form of digital data 612 from the processor 602 and transmit it to one or more receivers such as mobile devices or UE.

The UI 608 may include one or more user interface elements such as a touch screen, keypad, buttons, voice command processor, as well as other elements adapted for exchanging information with a user. The UI 608 may also include a display unit 610 configured to display a variety of information appropriate for a mobile device or UE 600 and may be implemented using any desirable display type such as for example organic light emitting diodes (OLED), liquid crystal display (LCD), as well as less complex elements such as LEDs or indicator lamps, etc. In certain embodiments the display unit 610 incorporates a touch screen for receiving information from the user of the wireless device 600. Alternatively, when exchanging information directly with a user or operator is not required the UI 608 may be replaced with a more desirable interface methodology, such as a network interface or other remote access technology, or removed completely.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus, comprising:
   a receiver configured to:
   receive a plurality of superposed symbols during a transmission time interval; and
   receive, prior to or during the transmission time interval, a first set of decoding information and superposition information including a power ratio, wherein the superposition information provides an indication that the transmission time interval includes superposed symbols; and
   a processor configured to:
   determine a first superposed symbol from the plurality of superposed symbols, based on the superposition information and when a modulation order of the first symbol is a pre-defined modulation order, wherein the first superposed symbol is corresponding to a first user equipment;
   generate a residual signal based on the first superposed symbol and the power ratio; and
   determine a second superposed symbol based on the residual signal and a second the first set of decoding information, wherein the second superposed symbol is corresponding to a second user equipment.

2. The apparatus of claim 1, wherein the receiver is configured to:
   receive, prior to the transmission time interval, a plurality of superposition information; and
   receive, during the transmission time interval, a superposition indicator, wherein the superposition indicator comprises a first index value indicating said superposition information among the plurality of superposition information;
   wherein the processor is further configured to
   select the superposition information from the plurality of superposition information based on the first index value.

3. The apparatus of claim 2, wherein the receiver is further configured to receive, prior to the transmission time interval, a plurality of sets of decoding information;
   wherein the first index value indicates the first set of decoding information among the plurality of sets decoding information, or the superposition indicator includes an second index value indicating the first set of decoding information among the plurality of sets decoding information;
   the processor is further configured to
   select the first set of decoding information from the plurality of sets of decoding information based on the first index value or the second index value.

4. The apparatus of claim 1, wherein the processor is further configured to determine a second set of decoding information based on the first set of decoding information and a decoding instruction, and the second set of decoding information is used for decoding the first superposed symbol.

5. The apparatus of claim 4, wherein the decoding instruction instructs part of second set of decoding information is reused as the first set of decoding information.

6. The apparatus of claim 1, wherein the power ratio indicates a transmit power of the first superposed symbol; and the processor is further configured to generate the residual signal based on the power ratio.

7. A method for receiving superposed symbols, the method comprising:
   receiving a plurality of superposed symbols during a transmission time interval;
   receiving, prior to or during the transmission time interval, a first set of decoding information and superposition information including a power ratio, wherein the superposition information provides an indication that the transmission time interval includes superposed symbols;
   determining a first superposed symbol from the plurality of superposed symbols, based on the superposition information and when a modulation order of the first superposed symbol is a pre-defined modulation order, wherein the first superposed symbol is corresponding to a first user equipment;
   generating a residual signal based on the first superposed symbol and the power ratio; and
   determining a second second superposed symbol based on the residual signal and the first set of decoding information, wherein the second superposed symbol is corresponding to a second user equipment.

8. The apparatus of claim 2, wherein the first index value identifies an entry of a power ratio table, and the power ratio table comprises multiple entries respectively comprising at least one power ratio value.

9. The apparatus of claim 1, where the processor determines the first superposed symbol from said plurality of superposed symbols further based on when the first superposed symbol and the second superposed symbol occupy the same resource blocks (RBs).

10. The apparatus of claim 1, where the processor determines the first superposed symbol from said plurality of superposed symbols further based on when the antenna port corresponding to the first UE and the antenna port of the second UE use the same REs, or when the first superposed symbol and the second superposed symbol use a same spatial layer.

* * * * *